C. M. COLE.
FLUID GAGE.
APPLICATION FILED MAR. 31, 1916.

1,224,713.

Patented May 1, 1917.
2 SHEETS—SHEET 1.

Inventor
Clifford M. Cole
By Victor J. Evans
Attorney

Witnesses
J. L. Wright

C. M. COLE.
FLUID GAGE.
APPLICATION FILED MAR. 31, 1916.
1,224,713.
Patented May 1, 1917.
2 SHEETS—SHEET 2.
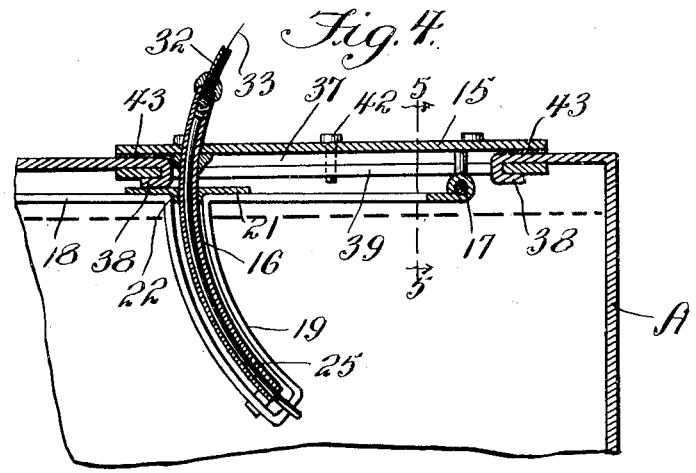
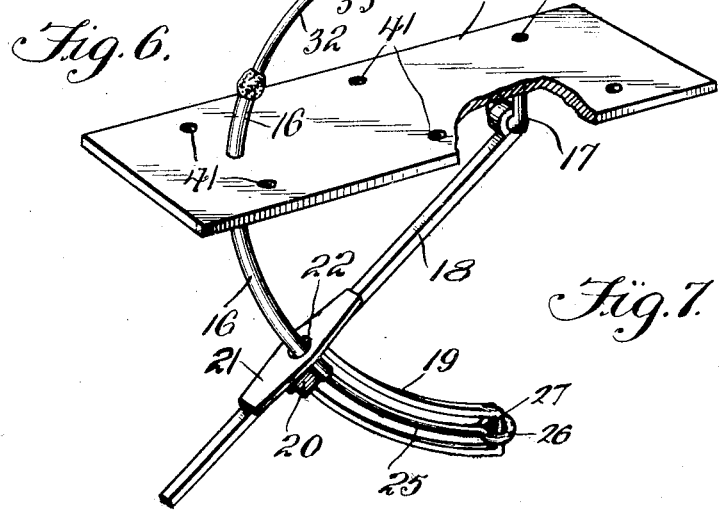
Inventor
Clifford M. Cole
Witnesses
By Victor J. Evans
Attorney

UNITED STATES PATENT OFFICE.

CLIFFORD M. COLE, OF LANDER, WYOMING, ASSIGNOR OF ONE-HALF TO WILLIAM S. ADAMS, OF RIVERTON, WYOMING.

FLUID-GAGE.

1,224,713. Specification of Letters Patent. Patented May 1, 1917.

Application filed March 31, 1916. Serial No. 88,084.

*To all whom it may concern:*

Be it known that I, CLIFFORD M. COLE, a citizen of the United States, residing at Lander, in the county of Fremont and State of Wyoming, have invented new and useful Improvements in Fluid-Gages, of which the following is a specification.

This invention relates to fluid gages, and it has particular reference to devices for indicating the quantity of gasolene contained in the tanks of motor vehicles and the like.

The invention has for its object to produce a device of the character set forth which will be of simple and improved construction, easily and inexpensively installed and which will correctly indicate the quantity of gasolene contained in the tank to which it is applied.

A further object of the invention is to produce a device of the character described wherein the indicator gage will be clearly visible and readable at all times.

Further objects of the invention are to simplify and improve the construction and arrangement of the detailed parts constituting the device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Fig. 4 is a sectional detail view, enlarged, taken on the line 4—4 in Fig. 2, through the top portion of the tank showing the manner of connecting the improved gage device therewith.

Fig. 5 is a sectional detail view taken on the line 5—5 in Fig. 4.

Fig. 6 is a perspective detail view showing the base plate of the device, together with a portion of the float carrying the lever and related parts.

Corresponding parts in the several figures are denoted by like characters of reference.

Figure 1:
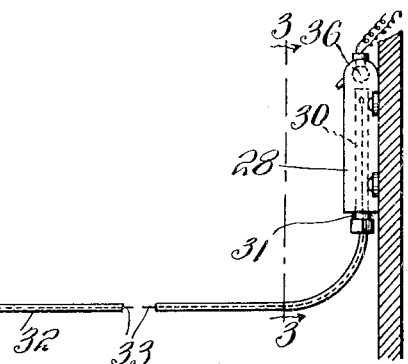
Figure 1 is a view partly in side elevation and partly in section showing a portion of a tank to which the invention has been applied and showing also the gage and the connecting means whereby the gage indicator is actuated.
Figure 3:
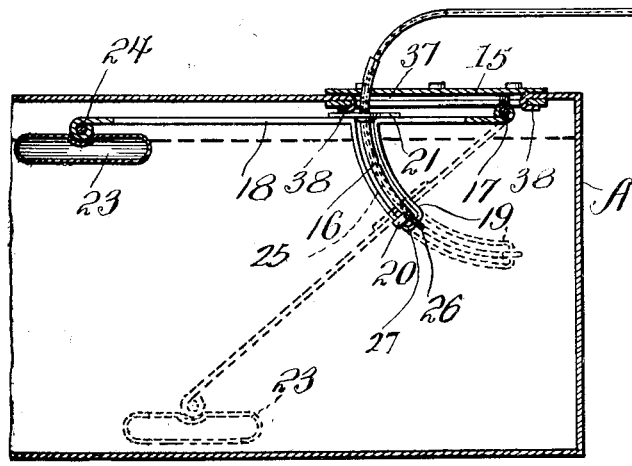
Fig. 3 is a sectional detail view taken on the line 3—3 in Fig. 1.
Figure 3:
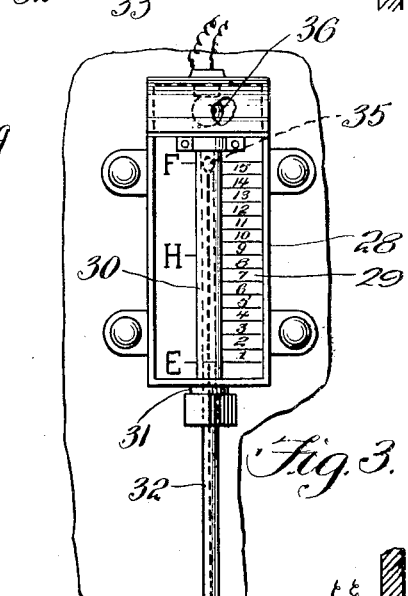
Figure 2:
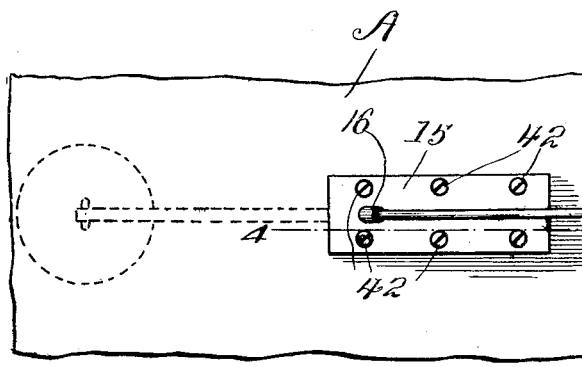
Fig. 2 is a top plan view.

The base plate 15 is a rectangular plate of brass or other metal having an aperture through which extends an arcuate tube 16, the greater portion of which extends downwardly with respect to the plate. The arcuate tube 16 is concentric with the fulcrum 17 of an arm or lever 18 which is bent so as to form intermediate the ends thereof a loop or yoke 19 which is adapted to receive the tube 16 between the limbs thereof, said tube being provided with guide flanges 20 between which one limb of the yoke is guided, and said lever being provided with a bridge piece or brace 21 having an aperture 22 for the passage of the tube 16. The loop or yoke 19 is at least coextensive with that portion of the tube 16 which extends downwardly with respect to the base plate 15, and it will be seen that the lever is free to move in the arc defined between the bottom face of the plate 15 and the upper edges of the guide flanges 20, the parts being obviously so proportioned as to allow ample movement for the purposes of the device. Hingedly connected with the free end of the lever 18 is a float 23 which, owing to the hinge connection 24, will at all times be free to occupy an approximately horizontal position.

The tube 16 is preferably a drawn metal tube of small diameter, although large enough to accommodate a rod or wire 25 which is bent to actuate form corresponding with that of the tube through which it is free to slide, the lower end of said rod being provided with an eye 26 engaging the bridge piece 27 of the loop or yoke 19, the rod 25 being about coextensive with the tube 16. The latter, as stated, projects slightly above the base plate 15 so that the rod 25 will not become disengaged from the tube when the lever 18 swings to the downward limit of its movement.

The indicating element of the device is illustrated as comprising a casing 28 adapted to be mounted on the dash board of a motor vehicle or in any position where it may be conveniently observed, said casing containing an indicating scale 29 and a vertically disposed glass tube 30, said tube being open at its lower end and communicating with a collar 31 at the lower end of the casing 28. The collar 31 is connected by a drawn metal tube 32 of small diameter with that portion of the tube 16 which extends upwardly with respect to the base plate 15, the guide tube 32 being preferably of smaller diameter than that of the tube 16, as well as the collar 31 so that the terminals of the said tube may be extended a short distance within said tube 16 and collar 31 and be there secured by solder in any appropriate manner. A fine wire 33 which extends through the tube 32 is connected at one end with the rod 25; the other end of said wire 33 which extends within the glass tube 30 is bent or twisted on itself, as indicated at 34, in Fig. 7, the said bent or twisted portion being immersed in material such as brightly colored sealing wax which when permitted to cool will form a small but readily visible head 35 which operates within the glass tube 30. The parts are obviously to be so proportioned that the tube 32 will have no unnecessary bends or curves, such curves as do exist being of such radius as to enable the wire 33 to operate freely in the tubes 32 and 30. It is, furthermore, obvious that the scale 29 is to be so proportioned as to correctly indicate the capacity of the tank with which the device is connected, as will be presently described. It may, furthermore, be stated that the indicating device may be illuminated by a small electric lamp which has been conventionally indicated at 36, it being understood, however, that proper illumination may be provided for in any well known manner.

The tank which is indicated at A is of ordinary well known construction. When assembling the improved gage device therewith there is cut in the top of the tank a rectangular slot or opening 37 at the ends of which tongues 38 are formed. A rectangular plate 39 is inserted through the slot 37 and is placed adjacent to the top of the tank where it is held by means of the tongues 38 which are bent downwardly on the end portions of the plate. The plate 39 is provided with screw threaded apertures 40, and corresponding apertures 41 are formed in the base plate 15 for the admission of machine screws 42 which are engaged with the apertures 40, thereby assembling the base plate 15 and all the parts connected therewith with the tank. A gasket 43 of rubber is preferably interposed to assist in the formation of an absolutely tight joint. In this simple manner it will be seen that the improved gage attachment may be readily installed on a gasolene tank of any ordinary construction, it being equally obvious that the device may be very conveniently removed when desired for any purpose.

In the operation of this device, it will be readily seen that the float 23 will be sustained by the gasolene contained in the tank and will rise and fall as the level varies. The rod 25 will operate freely in the guide tube 16, and the fine wire will slide unobstructedly through the tube 32, the indicating head 35 moving within the glass tube 30 where it will be at all times clearly visible, thereby indicating on the scale 29 the exact contents of the tank. The device may be manufactured and installed at a very moderate cost; it requires no attention to keep it in working order, and it will at all times correctly indicate the quantity of gasolene contained in the tank, thus saving the operator the annoying task of measuring or guessing at the contents in the ways now commonly resorted to.

Having thus described the invention, what is claimed as new, is:—

1. In a fluid gage, a float-carrying lever fulcrumed within a tank, an arcuate tube supported in concentric relation with the fulcrum of the lever, an arcuate rod connected with the lever and guided through the tube, an indicator casing spaced from the tank and having a scale and a transparent tube, a flexible tube of relatively small diameter extending between and terminally connected with the arcuate guide tube and with the indicator casing, said flexible tube being in communication with the arcuate tube and also with the glass tube, a wire extending through the flexible tube, said wire being terminally connected at one end with the rod guided in the arcuate tube, and an indicating member carried by said wire and operating in the glass tube.

2. In a device of the class described, a supporting member, a float-carrying lever fulcrumed thereon, an arcuate guide tube extending through the supporting member, and a rod connected with the float-carrying lever and guided through the tube.

3. In a device of the class described, a supporting member, a float-carrying lever fulcrumed thereon, said lever having an arcuate yoke formed intermediate its ends, an arcuate guide tube extending through the supporting member, guide flanges on said tube between which one of the limbs of the yoke is guided, and an arcuate rod connected with the bridge portion of the yoke of the lever and guided through the arcuate tube.

4. In a device of the class described, a tank having a rectangular opening provided with tongues at the ends thereof, a washer frame supported adjacent to said opening by said tongues and having threaded apertures, a base plate mounted adjacent to said opening and having apertures corresponding with the threaded apertures of the washer frame, machine screws connecting the base plate with the washer frame, a lever fulcrumed on the underside of the base plate and extending within the tank, said lever having a float hingedly connected therewith, and said lever having an arcuate yoke intermediate the ends thereof, an arcuate tube extending through the base plate and having guide flanges engaging one limb of the yoke, an arcuate rod connected with the yoke and extending through the arcuate guide tube, an indicator casing having a scale and a glass tube, a flexible tube connected terminally with the casing and with the arcuate guide tube and communicating with the latter and also with the glass tube in the indicator casing, a wire terminally connected with the arcuate rod and extending through the flexible tube and within the glass tube, and an indicating member carried by said wire and slidable in the glass tube.

In testimony whereof I affix my signature in presence of two witnesses.

CLIFFORD M. COLE.

Witnesses:
H. S. HARNSBERGER,
T. E. COLE.